Jan. 5, 1971  P. DAYSON  3,552,096
APPARATUS FOR DRYING AIR OR OTHER GAS
Filed July 11, 1967  5 Sheets-Sheet 1

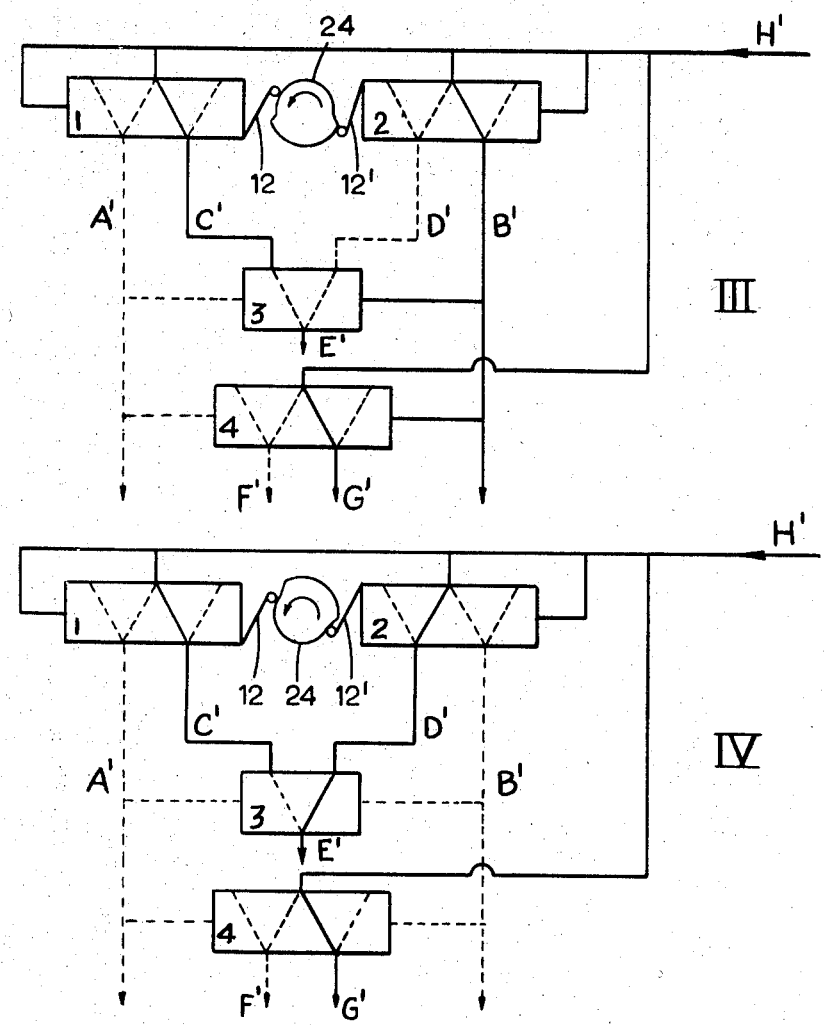

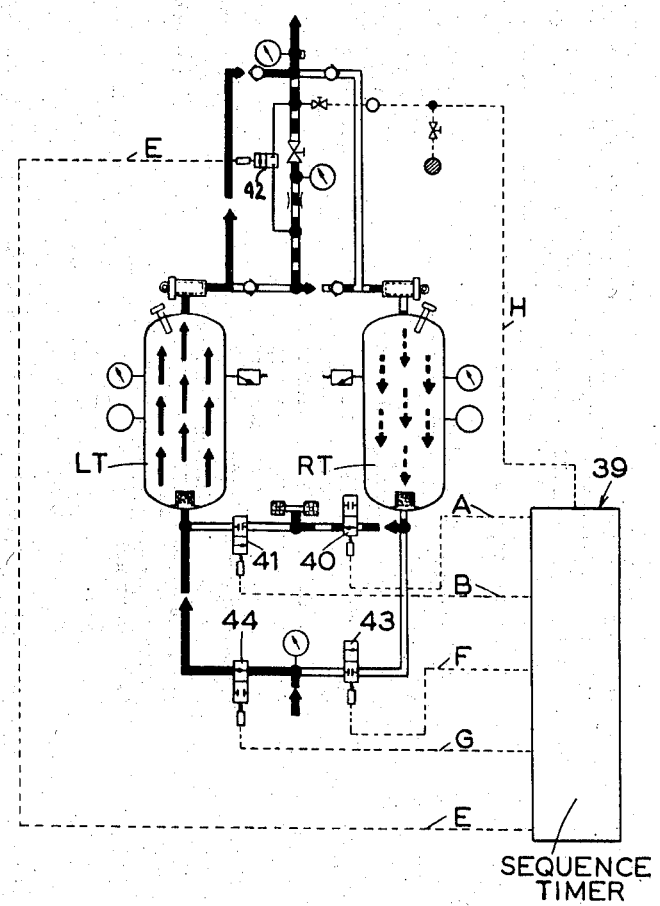
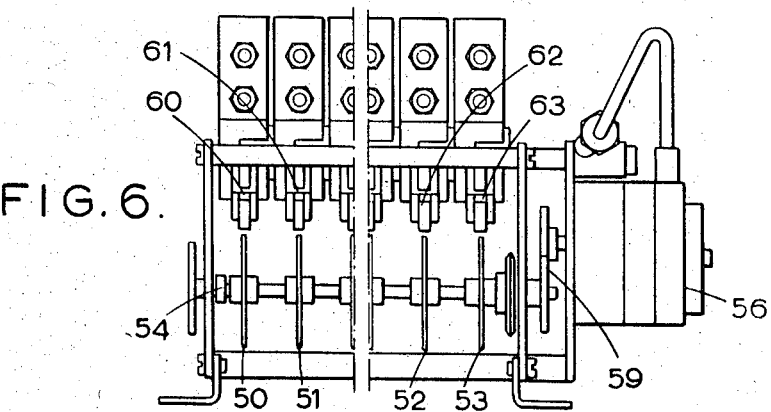

United States Patent Office

3,552,096
Patented Jan. 5, 1971

3,552,096
APPARATUS FOR DRYING AIR OR OTHER GAS
Philip Dayson, St. Laurent, Montreal, Canada, assignor to Pall Corporation, Glen Cove, N.Y., a corporation of New York
Filed July 11, 1967, Ser. No. 652,550
Claims priority, application Great Britain, July 13, 1966, 31,539/66
Int. Cl. B01d 153/04
U.S. Cl. 55—163                                4 Claims

ABSTRACT OF THE DISCLOSURE

A gas processing apparatus employing effluent gas to drive a timing and switching apparatus and a gas driven timing and switching apparatus are provided by this invention. The timing and switching apparatus employs a turbine driven by gas flow to drive and time the actuation of a plurality of valves which control flow to a plurality of lines. The gas processing apparatus provides the flow of effluent fluid which is employed to drive the turbine.

---

This invention relates to an apparatus for drying air or other gas (hereinafter generally referred to as gas) and more particularly to a valve switching system for such apparatus.

A known type of drying apparatus, called a desiccant dryer, is, for example, described in U.S. patent specification No. 2,944,627 dated July 12, 1960 and No. 3,069,830 dated Dec. 25, 1962. These specifications describe an apparatus for fractionating gaseous mixtures employing two tanks, of which one is normally on stream in a cycle called the adsorption cycle, because it removes by adsorption a selected component from a gas mixture, and of which the other is on a cycle called the desorption cycle, because it is being regenerated by the passage through it of a portion of the effluent from a fractionating tank. When the adsorption cycle is complete, the influent gaseous mixture is then diverted to the tank just regenerated, using appropriate valving. This known apparatus is operated without the application of heat, and this is achieved by carrying out of the fractionation or adsorption at a superatmospheric pressure, the desorption or regeneration being carried out at atmospheric pressure. In order to conserve for the desorption cycle the heat evolved on adsorption, very short cycles are employed, generally not exceeding two or three minutes, and preferably less than one minute. Thus, the influent gaseous mixture is very frequently shifted from the one tank to the other and at the end of each cycle the pressure of ags in each tank must be rapidly adjusted to the proper pressure for adsorption or for the desorption, as required. This known apparatus uses a group of valves for this purpose, these valves being automatically operated by means of a cycle timing device. However, such timing devices require a source of electricity, which is not always available, and if it is available, is subject to power failures. Furthermore, electrical equipment has the additional disadvantage of requiring expensive explosion proof equipment when the apparatus is to be used in hazardous areas.

U.S. specification No. 3,229,719 dated Jan. 18, 1966 describes and claims a pneumatic rotary gas valve for use with drying apparatus of the heatless type. This valve is gas operated, by reciprocation of a piston between two special positions, and the time required for the piston to travel between these positions is controlled by gas flow, and corresponds to the desired cycling times for the drying apparatus. The valve is well suited for the purpose, but it is costly and complicated in construction and rather large in size. Moreover, the main gas flow is directed through the valve, which renders it unsuitable for large applications.

The present invention provides a simple, inexpensive, satisfactory valving and timer system which is gas timed by the effluent gas from the adsorptions or fractionating tank, via a gas or air motor and associated cams, gears and valves to control gas flow, and does not require the use of an electrically operated valving system. The timing mechanism and flow controls can be automatically set to provide the necessary adjustment of the pressure of the tank in changing from the adsorption to desorption cycles, and vice versa, as well as to provide for a suitable cycle for the repressurization and adsorption and desorption operations.

In the valve switching system of the invention, the motive force for switching the cycling valves of a drying apparatus is provided by an air or gas motor, that is operated by gas effluent from the dryer. The timing of the interval between switching operations of the system is controlled by a cam also operated by the air or gas motor, and timing is adjusted to meet any system requirements by control of the rate of rotation of the cam, and the shape and circumference of the cam surface. The rate of rotation of the motor can be adjusted to control the rate of rotation of the cam.

The valve-switching system finds its best use in control of gas flow to gas operated valves in the various lines of the drying apparatus, so that all flow is in effect gas-controlled and gas-operated, eliminating electrical solenoid valves.

According to the present invention, an apparatus for drying gas such as air comprises at least two drying chambers each containing a desiccant; an inlet conduit for gas to be dried, said conduit having a branch leading to each of the drying chambers; an outlet conduit for dried gas, the said conduit having a branch leading from each of the drying chambers; a conduit for bleeding gas from the said outlet branches whereby dried gas can be passed from one to the other of the drying chambers as desired to purge or regenerate desiccant therein; a plurality of switching valves operable to control flow of gas to be dried and dried gas through each one of the drying chambers in turn, and through the conduits, and a valve switching system including a timing device such as a cam operable to control the switching valves, the said device being driven by an air or gas motor operated by effluent gas from the dried gas outlet conduits.

The use of effluent gas from the dryer is an important feature of the present invention. Air or gas motors normally are operated by compressed air from a compressor or other source, but they have a notoriously short life, and consequently have found only a limited field of usefulness. Use of dry gas effluent not only avoids the need for a separate source of supply of operating air but also ensures a pure gas that considerably extends the life of the motor. It also links operation of the motor with the operations of the dryer in such a way that the cycle is not lost when the dryer is shut down, since the timer operates only while gas effluent is being supplied to it. The effluent furthermore can be recovered and returned to the drying apparatus, if it is too valuable to vent to the atmosphere.

The valves, actuation of which is effected by the valving system of the invention, can be arranged so as to be independently actuated, each by its own timing cam and cam follower. This permits maximum flexibility of timed sequence of operation. In the preferred embodiment, however, and this is a further feature of the invention, the valves are operated by cam-followers which are displaced by a single rotatable cam driven by the air motor, and the air or gas motor is a turbine driven by the gas bled from the outlet conduit under the control of a pressure reducing valve; a reduction gear is arranged between the turbine and the cam. The valves are mounted on a base (which may be the base of a valve housing) and are interconnected by passages in the form of grooves or routings in the base. This results in a simple, inexpensive, compact valving system which has low susceptibility to gas leakage and facilitates replacement of the component valves as desired.

The air or gas motor that is employed is of conventional design, and is commercially available. It is unusual, however, in that it is operated at low r.p.m., preferably below 5000 r.p.m. It comprises a gas-operated turbine, a shaft driven by the turbine that operates the cam, and if desired a reduction or multiplication gear system to obtain any desired cam rotation speed. A brake can also be provided to prevent excessively high r.p.m. The gas is projected at the vanes on the turbine to operate the motor.

Figure 4:
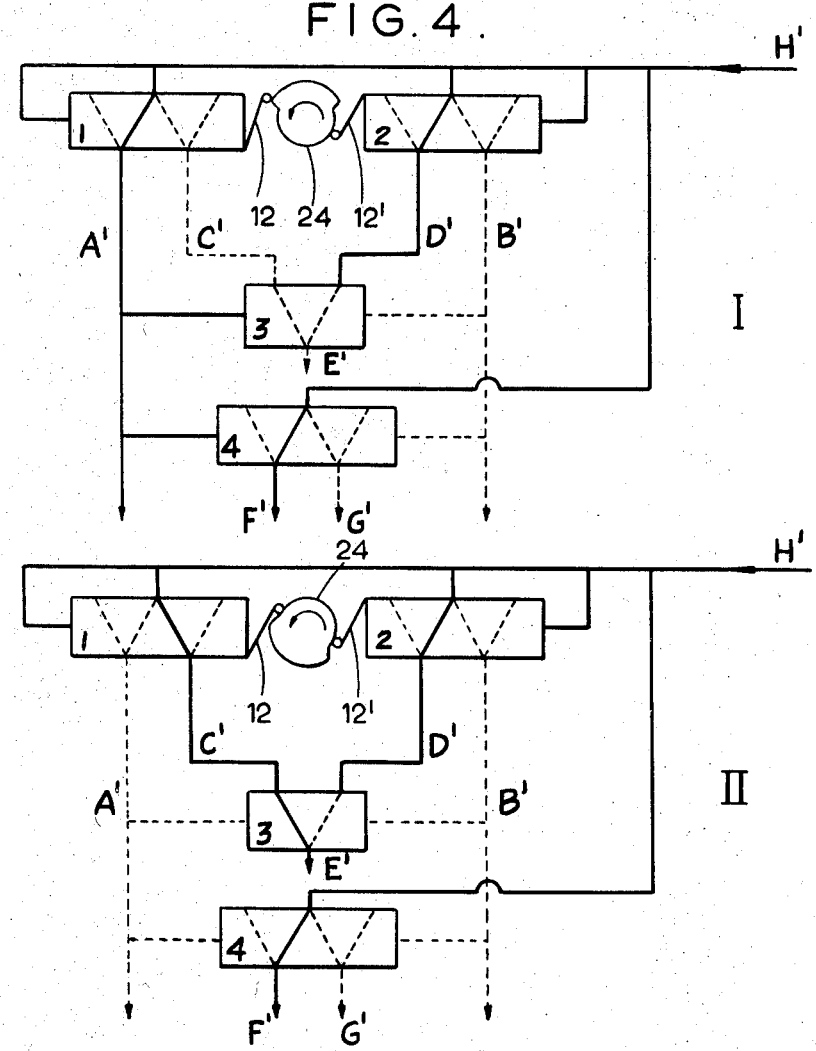

FIG. 4, positions 1 to 4 are schematic diagrams illustrating the valving system according to the present invention at four operating positions.

FIG. 5 is a schematic view of a dryer apparatus including a valve switching system operating all the valves by a single cam.

FIG. 6 is a plan view of another embodiment of valve switching system of the invention.

Figure 1:
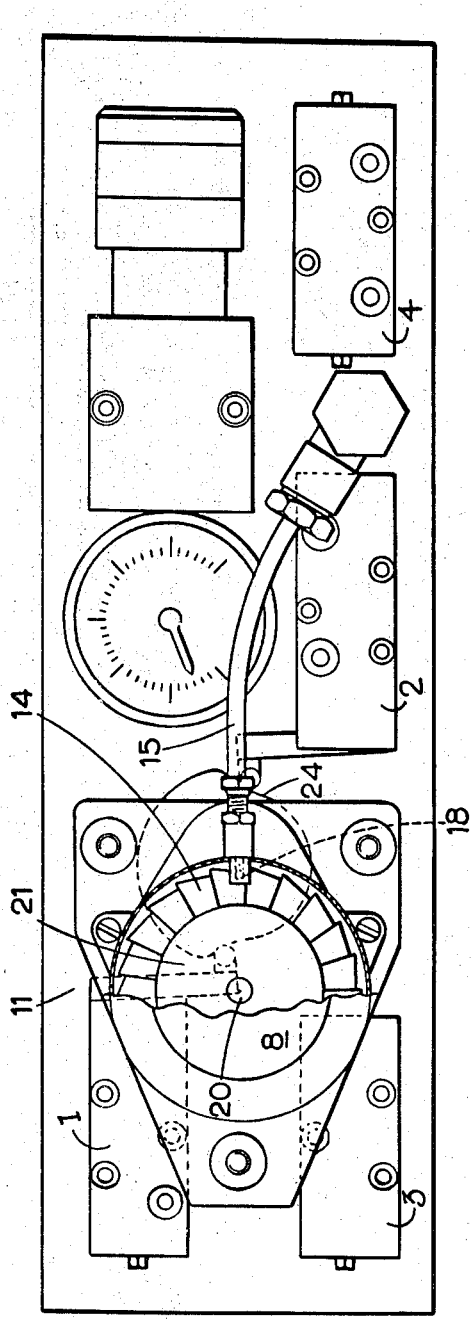
FIG. 1 is a plan view in schematic form, of a valve switching system according to this invention, with parts partly broken away for better representation.
Figure 2:
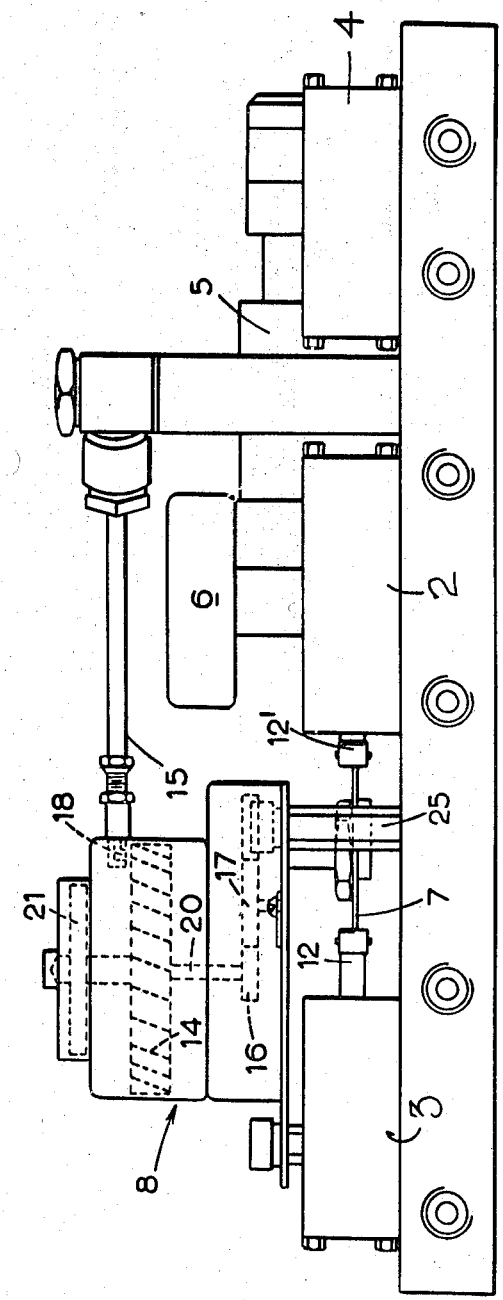
FIG. 2 is a side view of the valve switching system of FIG. 1, with parts partly broken away for better representation.
Figure 3:
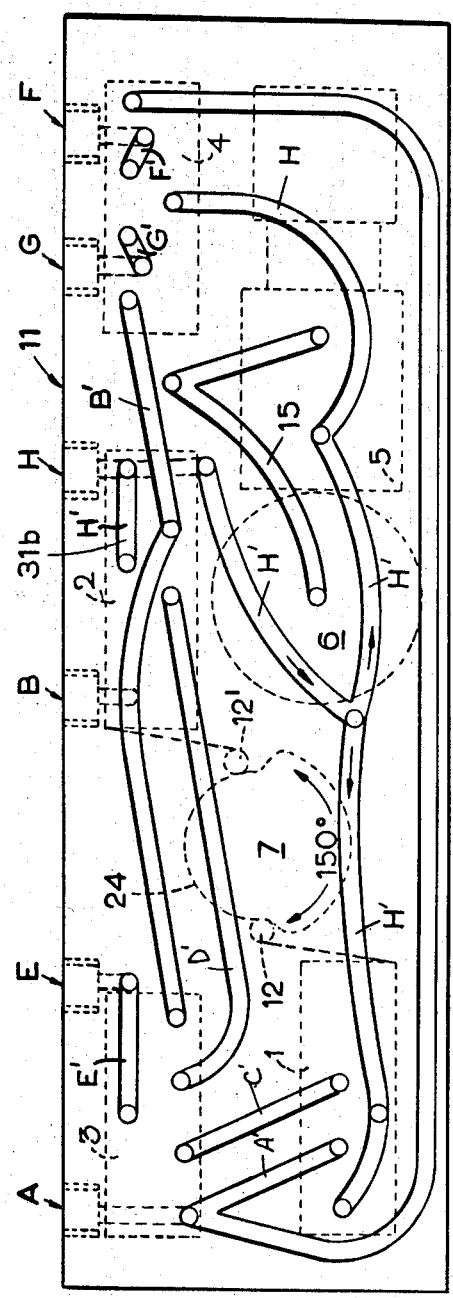
FIG. 3 is a bottom view of the valve switching system of FIG. 1, showing the ducting recessed in the plate for gas connections among the various parts.

In the apparatus illustrated in FIGS. 1 to 3, a plurality of switching valves 1, 2, 3 and 4 are mounted on a base plate 11. These valves are spool valves which may be of known construction and are shown diagrammatically in FIG. 4. The valves 1, 2 have cam followers 12, 12' which are displaced by movement of a cam cut at 24 to depress cam followers 12, 12' for 150° of a cycle. The cam 7 is rotatable about an axis perpendicular to the base 11 by an air turbine motor 8. The air motor has a turbine speed of 1200 r.p.m., and is operated by 0.5 s.c.f.m. of gas bled via line H from the dried gas outlet conduit of the drying apparatus of FIG 5. The gas initially at a high pressure, say of about 60 to 150 p.s.i. passes from the conduit into a pressure reducing and regulating valve 5 whence it passes now at 25 p.s.i., via a pressure gauge 6 to the turbine 14 of the air motor via line 15 via jet orifice 18 which directs it downwardly against the vanes of the turbine.

The turbine 14 may be of metal or plastic, such as polyethylene, polypropylene, nylon or Teflon (registered trademark) and is mounted on a shaft 20 with a centrifugal speed governor 21. The shaft 20 is connected with an output shaft 25 through a reduction gearing 16, 17. The cam 7 is mounted on the output shaft 25, and rotates therewith.

It is now evident that one full 360° rotation of the cam by the air motor 8 constitutes one complete cycle, and that the length of the arc described by the cut out portion 24 determines the proportions of the cycle during which the cam followers 12, 12' are not depressed by the cam and hence not actuated. If now the rate of rotation of the cam is appropriately set, the time for each complete cycle is determined.

The device shown is set for an ten minute cycle, with the cam followers depressed for $^{150}/_{360}$ of the cycle, or approximately four minutes. Obviously any type and duration of operation of the cam followers can be provided for by merely changing the arc of the cut out portions. Two actuations can be obtained per cycle by two cut out portions and so on.

In the device shown, one cam is sufficient to actuate four valves 1, 2, 3, 4, by arrangement on the base 11. Each of valves 1 and 2 is so placed that the cam 7 actuates their respective cam followers 12, 12' in timed sequence best followed in FIG. 4. Valves 1 and 3 are interconnected by routing A' in the base 11 so that when valve 1 is brought into position 1 of FIG. 4, valve 3 is also actuated by gas from valve 1, into position and in the same way valves 2 and 3 are interconnected by line routing B' so that when valve 2 is brought into the position 3 of FIG. 4, valve 3 is also actuated by gas from valve 2 to the position 3.

Inlet air proceeds via port hand routing H' in the base 11 to valve 4, valve 5, valve 1 and valve 2.

Valve Nos. 1 and 2 are four way spool valves, lever bled, and actuated by cam followers 12, 12' respectively, into positions 1 and 3, respectively, of FIG. 4.

Valve No. 3 is a three way spool valve, double pilot operated (via lines A and B).

Valve No. 4 is a four way spool valve, double pilot operated (from valve 2 via routing B' and from valve 1 via routing A', so that valve 4 is brought to position 1 when valve 1 is actuated, and to positions 3 when valve 2 is actuated).

The manner in which these valves operate the valves of a typical two-tank dryer apparatus is shown in FIG. 5. The valve 1 is connected to purge exhaust valve 40 via line A, and valve 2 is connected to exhaust valve 41 via line B. Valve 3 is connected to repressurizing valve 42 via line E, and valve 4 is connected via lines F and G to inlet switching valves 43, 44 respectively. In this way, complete control of gas flow through the dryer is obtained. The valves 40, 41 and 42 are opened by gas pressure and self-closing when pressure is reduced. Valves 43 and 44 are closed by gas pressure and self-opening when pressure is reduced. The system can also be arranged to utilize ball valves if desired. The valve switching systems itself indicated generally at 39 is operated via gas effluent supplied thereto by line H.

The valves 40, 41, 43, 44 are of the two-way type, but could be of the multi-port type if desired. The two-way valves are designed so that if there is failure in the air supply to the control unit the dryer controlled by the spool valves assumes a fail-safe position i.e. the wet gas influent valves are open to both tanks and the purge gas exhaust valves are closed to both tanks.

The sequence of operation is as follows:

At the start of the drying period of one tank LT of the drying apparatus to be controlled inlet valve 44 to tank LT is open, and purge exhaust valve 41 is closed. Repressurizing valve 42 is closed. Let it be assumed that the cam has just entered the position 1 shown in FIG. 4. Gas then passes through the valve 1 into line A, opening the exhaust valve 40 of the other tank RT, and depressing the tank. At the same time, as also passes through the valve 4 into the line F to close the inlet valve 43 of the tank RT. Valve 1 also directs gas via line A to bring valve 3 into the position 1 shown.

The switching valves are now so arranged that tank LT is drying the influent gas, while the other tank RT is being regenerated by purge gas effluent bled off and fed into tank RT at the top and exhausted at valve 40. This cycle continues while cam 7 depresses cam follower 12 and thus holds valve 1 in the position 1 for about 150° or about four minutes. Then cam follower 12 reaches the cut out portion 24 of cam 7, where upon valve 1 is shifted to positions 2, but cam follower 12' is not yet actuated. This situation obtains for about 30° of arc or about one minute.

Now gas will be directed by the valve 1 into passage C' to valve 3, which feeds it through line E to repressurization valve 42 opening it. The gas that was in the line A exhausts, and the loss of pressure from the line A closes the exhaust valve 40 of the tank RT. This permits repressurization of tank RT. Meanwhile, gas continues to flow through tank LT.

Continued rotation of the turbine 8 brings the cam 7 to the position 3 of FIG. 4. Now cam follower 12' is depressed by the cam 7, actuating valve 2. Gas then passes through the valve 2 into line B, to open the exhaust valve 41 of the tank LT. The air that was in the line E exhausts and the loss of pressure closes the repressurization valve 42. Actuation of valve 2 also results in actuation of valve 4, which shifts and now passes gas into line G thus closing the inlet valve 44 of the tank LT. The gas in line F exhausts, thus opening the inlet valve 43 of tank RT. Now tank RT is on the adsorption cycle and tank LT on the desorption or regeneration cycle. Gas passes through valve 43 into tank RT of the bottom, and purse gas effluent enter tank LT at the top, and vents at valve 41. This cycle continues while the cam 7 holds cam follower 12' depressed through 150° of arc, about four minutes, the same as with cam follower 12 of valve 1. At the end of this time, cam follower 12' enters the cutout portion 24 of cam 7, but cam follower 12 has not yet reached the end of this portion, and will not for another 30° of arc. The result is that valve 2 is shifted to the position 4 of FIG. 4.

Gas now is directed by the valve 2 into the passage D', and the gas that was in the line B exhaust. The loss of pressure from line B closes the exhaust valve 41 of the tank LT. The valve 3 diverts gas into the line H, thus opening the repressurization valve 42 and the tank LT is now brought up to line pressure. At the same time tank RT continues on the adsorption cycle.

The turbine 8 after about one minute rotates to bring the cam 8 to the position 1 shown in FIG. 4 and the cycle repeats itself.

The cam-operated switching system of FIG. 6 utilizes a separate cam for each valve, and each valve is provided with a cam follower. The air or gas motor is of exactly the same type as shown in FIGS. 1 and 3, and is operated by gas effuent in the same manner as that of FIGS. 1 to 5, via line H. The valves 1, 2, 3, 4 find their duplicates in the system of FIG. 6, and since they operate the gas dryer in the same way, reference to FIG. 5 will show how the system of FIG. 6 operates the switching valves of the dryer.

The system of FIG. 6 includes four cams 50, 51, 52, 53, all mounted on a common driven shaft 54 which is rotated via reduction gears 59 as in the system of FIGS. 1 to 3, from the turbine shaft of the air motor 56. Hence, all cams rotate at the same speed. Cams 50 and 52 have cut out portions extending over 210° of arc, with a resulting cam follower depressing portion extending over 150° of arc. Cam 51 has two cut out portions, each extending over 150° of arc, and two cam followers depressing portions extending over 30° of arc. Cam 53 has a cut out portion extending over 180° of arc. Cams 50 and 52 operate valves 1 and 2 respectively. Cam 51 operates valve 3, and cam 53 operates valve 4.

The cams are so placed with respect to each other that the valves 1, 2, 3, 4 are operated in the positions and sequence shown in FIG. 4. Thus, cam 50 operates valve 1 via its cam follower 60 into position 1 during 150° of arc; during positions 2, 3 and 4 cam follower 60 is not actuated, and the valve assumes the position shown. Cam 52 operates valve 2 via its cam follower 62 into position 3 during 150° of arc; during positions 1, 2 and 4 cam follower 62 is not actuated, and the valve assumes the position shown. Cam follower 61 is actuated by cam 51 twice per cycle, each time bringing valve 3 to a position to feed gas to valve 42 via line E. In this system, valve 3 receives gas directly from line H instead of via valves 1 and 2 as in the system of FIGS. 1 to 3. The position shown in position 2 of FIG. 4 is the "on" position, wherein gas can pass from line H to line E, the position shown in position 3 is the "off" position. The valve is "on" twice per cycle for 30° of arc, at the timed intervals represented in positions 2 and 4 of FIG. 4, over minute, approximately in actuations.

The valve 4, which also is fed directly from line H is actuated by cam 53 and its cam follower 63 for 180° of arc, approximately five minutes of each cycle, corresponding to positions 1 and 2 of FIG. 4, and is not actuated for 180° of arc, corresponding to positions 3 and 4 of FIG. 4. As a result, the valves of the dryer of FIG. 5 can be operated in exactly the same timed sequence as the switching system of FIGS. 1 to 3. It is apparent that by appropriate adjustment of the cam surfaces and their positions with respect to each other, as well as of the rate of rotation of the shaft 54, any timed series of actuations can be obtained, as well as any desired total length of cycle. As in the system of FIGS. 1 to 3 one complete rotation of the cam assembly defines one full cycle.

Having regard to the foregoing disclosure, the following is claimed as the inventive and potentable embodiments thereof:

1. An apparatus for processing gas comprising, in combination, gas processing means having at least two gas processing vessels, each vessel having an inlet and an outlet; valve means operable to control gas flow to and from each vessel; and a timing and switching apparatus for opening and closing the valve means at predetermined times for predetermined intervals to direct flow to and from the vessels at such times and intervals, said timing and switching apparatus comprising a gas inlet; at least two gas outlets; a turbine in fluid flow connection with the gas inlet of the timing and switching apparatus and driven by gas flow therefrom; a drive shaft mounted to rotate with said turbine; at least two valves in the housing, each controlling flow to an outlet of the timing and switching apparatus: eccentric timing means operatively connected to the drive shaft, and adapted to actuate the valves and control the duration of said actuation according to the rate of rotation of the turbine, and a plurality of passages selectively connecting the gas inlet of the timing and switching apparatus with a gas outlet thereof according to the position of said eccentric timing means to direct and control flow to the outlets; the gas inlet to said timing and switching apparatus communicating with an effluent line of the gas processing means and receiving effluent processed gas therefrom to drive said timing and switching apparatus.

2. An apparatus for processing gas in accordance with claim 1 in which two gas processing vessels are gas drying vessels.

3. An apparatus for processing gas in accordance with claim 2 including a dessicant in each vessel.

4. An apparatus for processing gas in accordance with claim 1 in which the valves operable to control flow of gas to and from each vessel are gas actuated valves operated by gas pressure.

References Cited
UNITED STATES PATENTS

| | | | |
|---|---|---|---|
| 3,080,693 | 3/1963 | Glass et al. | 55—163 |
| 3,160,486 | 12/1964 | Busch, Jr. | 137—624.14 |
| 3,405,733 | 10/1968 | Hansen | 137—624.14 |

REUBEN FRIEDMAN, Primary Examiner

C. N. HART, Assistant Examiner

U.S. Cl. X.R.
55—179; 137—624.14